US006870340B2

(12) United States Patent
Fukumura et al.

(10) Patent No.: US 6,870,340 B2
(45) Date of Patent: Mar. 22, 2005

(54) POSITION INITIALIZATION FOR A VEHICLE POWER CLOSURE SYSTEM

(75) Inventors: Tomohiro Fukumura, Rochester Hills, MI (US); Brian J. Marlett, Shelby Township, MI (US); Sanjaya Kumar Dash, Rochester Hills, MI (US)

(73) Assignee: Siemens VDO Automotive Corporation, Auburn Hills, MI (US)

( * ) Notice: Subject to any disclaimer, the term of this patent is extended or adjusted under 35 U.S.C. 154(b) by 0 days.

(21) Appl. No.: 10/733,699

(22) Filed: Dec. 11, 2003

(65) Prior Publication Data

US 2004/0124798 A1 Jul. 1, 2004

Related U.S. Application Data

(63) Continuation of application No. 10/244,036, filed on Sep. 13, 2002, now Pat. No. 6,734,648.

(60) Provisional application No. 60/402,720, filed on Aug. 12, 2002, provisional application No. 60/328,744, filed on Oct. 9, 2001, and provisional application No. 60/318,924, filed on Sep. 13, 2001.

(51) Int. Cl.$^{7}$ .................................................. G05D 3/00

(52) U.S. Cl. ........................ 318/468; 318/434; 318/280; 318/282; 318/286; 49/28

(58) Field of Search ................................. 318/468, 282, 318/286, 434, 266; 49/28

(56) References Cited

U.S. PATENT DOCUMENTS

| | | | | | |
|---|---|---|---|---|---|
| 5,396,158 | A | * | 3/1995 | Long et al. | 318/282 |
| 6,114,822 | A | * | 9/2000 | Ubelein et al. | 318/469 |
| 6,134,836 | A | * | 10/2000 | Kawanobe et al. | 49/360 |
| 6,181,094 | B1 | * | 1/2001 | Menke | 318/434 |
| 6,183,040 | B1 | * | 2/2001 | Imaizumi et al. | 296/155 |
| 6,199,322 | B1 | * | 3/2001 | Itami et al. | 49/139 |
| 6,246,195 | B1 | * | 6/2001 | Kloesters | 318/280 |
| 6,425,206 | B1 | * | 7/2002 | Noda et al. | 49/360 |
| 6,430,875 | B1 | * | 8/2002 | Clark et al. | 49/360 |

* cited by examiner

*Primary Examiner*—Rita Leykin

(57) ABSTRACT

A power closure system (40) for a vehicle panel (22, 24) includes position initialization techniques that ensure accurate position initialization. According to this invention, any slack in a coupling (62) between the vehicle panel and a motor (42) for moving the vehicle panel is removed prior to obtaining an initialization position reading when the panel (22, 24) is in a closed position. The inventive arrangement also includes determining a desired torque at which to operate the motor (42) during a position initialization procedure.

17 Claims, 7 Drawing Sheets

POSITION INITIALIZATION FOR A VEHICLE POWER CLOSURE SYSTEM

CROSS REFERENCE TO RELATED APPLICATIONS

This application is a continuation of U.S. application Ser. No. 10/244,036, which was filed on Sep. 13, 2002 now U.S. Pat. No. 6,734,648, which claims priority to U.S. Provisional Application Nos. 60/318,924, which was filed on Sep. 13, 2001; 60/328,774, which was filed on Oct. 9, 2001; and 60/402,720, which was filed on Aug. 12, 2002.

BACKGROUND OF THE INVENTION

This invention generally relates to power closure systems for vehicles. More particularly, this invention relates to obtaining initialization information for controlling movement of the position of a vehicle panel that can be automatically closed by a power closure system.

Power closure systems are used on vehicles for power sliding doors and power lift gates, for example. Typical arrangements have a clutch to selectively establish a mechanical coupling between an actuator such as a motor and the door or lift gate. The motor control arrangement typically includes a position sensor that monitors the position of the door during a power closure. Typical arrangements include "relative" position sensors such as encoders or Hall effect sensors associated with a rotating armature. Such relative sensors cannot tell absolute position and, therefore, techniques must be employed to achieve accurate position information for use during a power closure. It is necessary to initialize the position information from the sensor when the actual door or lift gate position is known.

Conventional techniques include initializing the position when the door or lift gate is closed. In conventional arrangements, however, the clutch is disengaged when the door is closed and the closure system is not in a state that accurately represents an operating state. For example, wire play and gear backlash occur because the system is no longer under tension once the clutch is disengaged. After this, there is not a proper correlation between the sensor position and the door or lift gate position. Therefore, position initialization is not accurate or reliable with such an approach.

This invention provides improved position initialization, in part, by eliminating any slack in the coupling between the motor and the door or lift gate prior to determining the initialization position information.

SUMMARY OF THE INVENTION

In general terms, this invention is a position initialization system and method for accurately initializing a sensor position so that an absolute position of a moveable panel on a vehicle can be determined.

An example system designed according to this invention includes a motor that provides the force for moving the moveable panel (i.e., the door or lift gate). A coupling couples the motor to the panel and includes a varying tension between the motor and the panel, depending on the operating state of the system. A position sensor is associated with a coupling and provides an indication of the panel position. An indicator provides an indication when the panel is in a closed position. A controller energizes the motor responsive to the closed position indication to urge the panel toward the closed position to reduce any slack between the motor and the panel. The controller obtains an initialization position indication from the position sensor when there is no slack.

A method according to this invention includes several steps. An example method includes determining that the panel is in a closed position. Then the motor is energized to urge the panel toward the closed position to reduce any slack between the motor and the panel. The initialization position is determined when there is no slack.

In one example arrangement designed according to this invention, the motor operates at a selected torque during the slack reduction process. The selected torque preferably corresponds to the operating torque of the motor while moving the panel from an open position to a closed position. In one example, the selected torque is determined as an average torque between two selected points along the panel travel from the open position to the closed position.

In one example, a controller determines the appropriate motor torque only when the motor has not stalled or the panel has not encountered any obstructions while moving between the two selected points.

The various features and advantages of this invention will become apparent to those skilled in the art from the following detailed description of the currently preferred embodiments. The drawings that accompany the detailed description can be briefly described as follows.

DETAILED DESCRIPTION OF THE PREFERRED EMBODIMENTS

Figure 1:
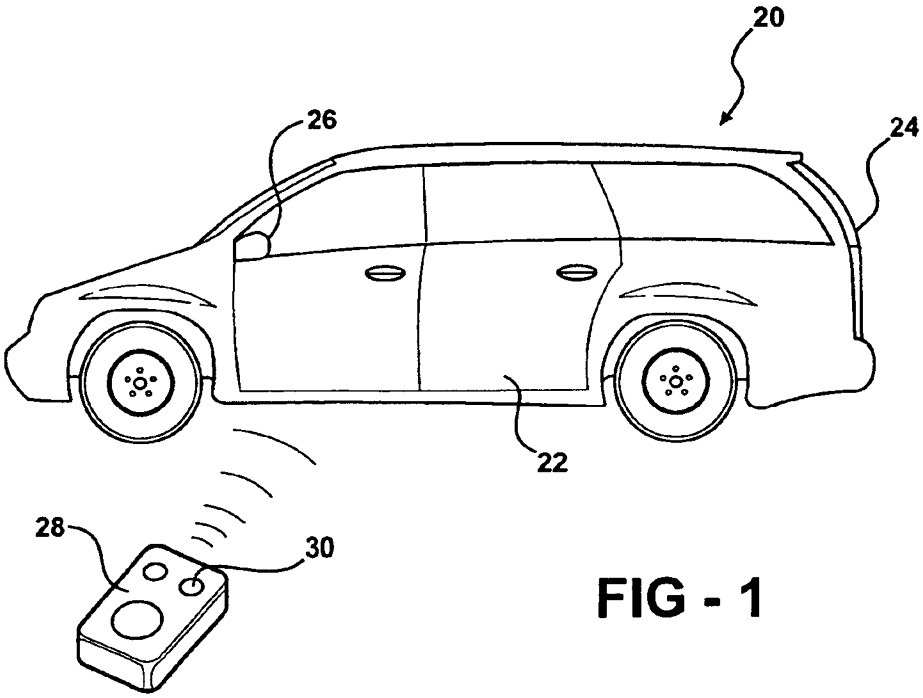
FIG. 1 schematically illustrates a vehicle having moveable panels that are controlled by a system designed according to this invention.

FIG. 1 schematically illustrates a vehicle 20 having a moveable door panel 22 and a moveable lift gate 24. The vehicle 20 is provided with a system designed according to this invention for automatically moving the door 22 or lift gate 24 with a power closure arrangement that operates as generally known in the art.

The illustrated example vehicle includes a switch 26 supported within a vehicle for selectively activating the power closure system to close the door 22 or lift gate 24. The illustrated example also includes a remote signaling device 28 such as a key fob having at least one switch 30 that an individual can use to selectively activate the power closure system.

This invention is particularly useful for vehicle sliding doors or lift gates but is not necessarily so limited. A variety of moveable panels on vehicles can be controlled using an arrangement designed according to this invention.

Figure 2:
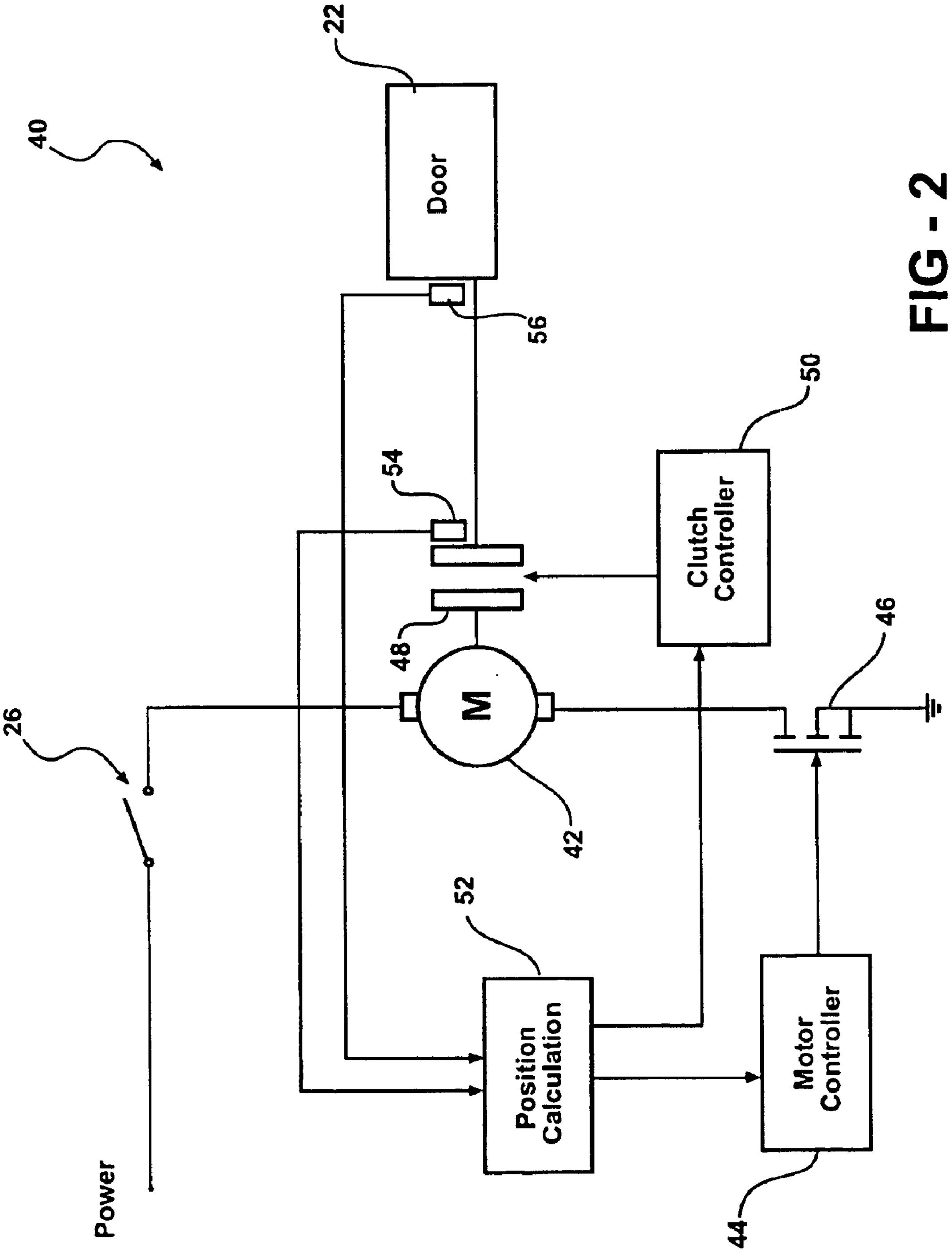
FIG. 2 schematically illustrates one example panel moving arrangement designed according to this invention.

FIG. 2 schematically illustrates a system 40 that selectively provides power closure for a vehicle panel. For purposes of discussion, the door 22 will be selected as the example panel through the remainder of this discussion. A motor 42 is controlled by a motor controller module 44 responsive, for example, to activation of the switch 26 or 30. A motor driver 46 such as a power MOS FET as shown in FIG. 2 regulates power to the motor 42 to achieve desired torque levels and to move the door 22 at a desired speed.

A clutch 48 selectively provides a mechanical coupling between the motor 42 and the door 22. A clutch controller module 50 selectively causes the clutch 48 to be engaged or disengaged, depending on the needs at a given time. For example, the clutch controller 50 may be programmed to disengage the clutch 48 in such event that an individual manually moves the door. Those skilled in the art realize that there are a variety of ways to provide such operating features in a system like that schematically illustrated in FIG. 2.

Part of the control strategy of the system 40 includes monitoring the position of the door 22. The illustrated arrangement includes a position calculation module 52 that receives information from a sensor 54 and a home position switch 56. The sensor 54 in one example is an encoder. In another example, the sensor 54 is a Hall effect sensor. The sensor 54 in the illustrated example provides position information regarding a position of the door 22 to the position calculation module 52.

The home position switch 56 provides an indication to the position calculation module 52 that the door 22 has reached a closed position. Such home position switches are known and those skilled in the art who have the benefit of this description will be able to select from among commercially available components to meet the needs of their particular situation.

Although individual modules 44, 50 and 52 are shown in FIG. 2, those divisions are schematic and for discussion purposes only. All of the control modules of a system designed according to this invention may be incorporated into a single microprocessor that is suitably programmed to perform the different functions of each module. Further, each module may comprise a microprocessor, dedicated circuitry, software or a combination of these. Those skilled in the art who have the benefit of this description will be able to select what works best for their particular situation and will be able to develop the programming for accomplishing the results provided by the invention.

This invention addresses the need for providing accurate position initialization so that the absolute position of the door 22 can be determined. The nature of relative sensors, such as encoders or Hall effect sensors, for example, makes it necessary to employ the inventive technique for obtaining an initialization position for accurately determining the absolute position of the door 22.

Figure 3:
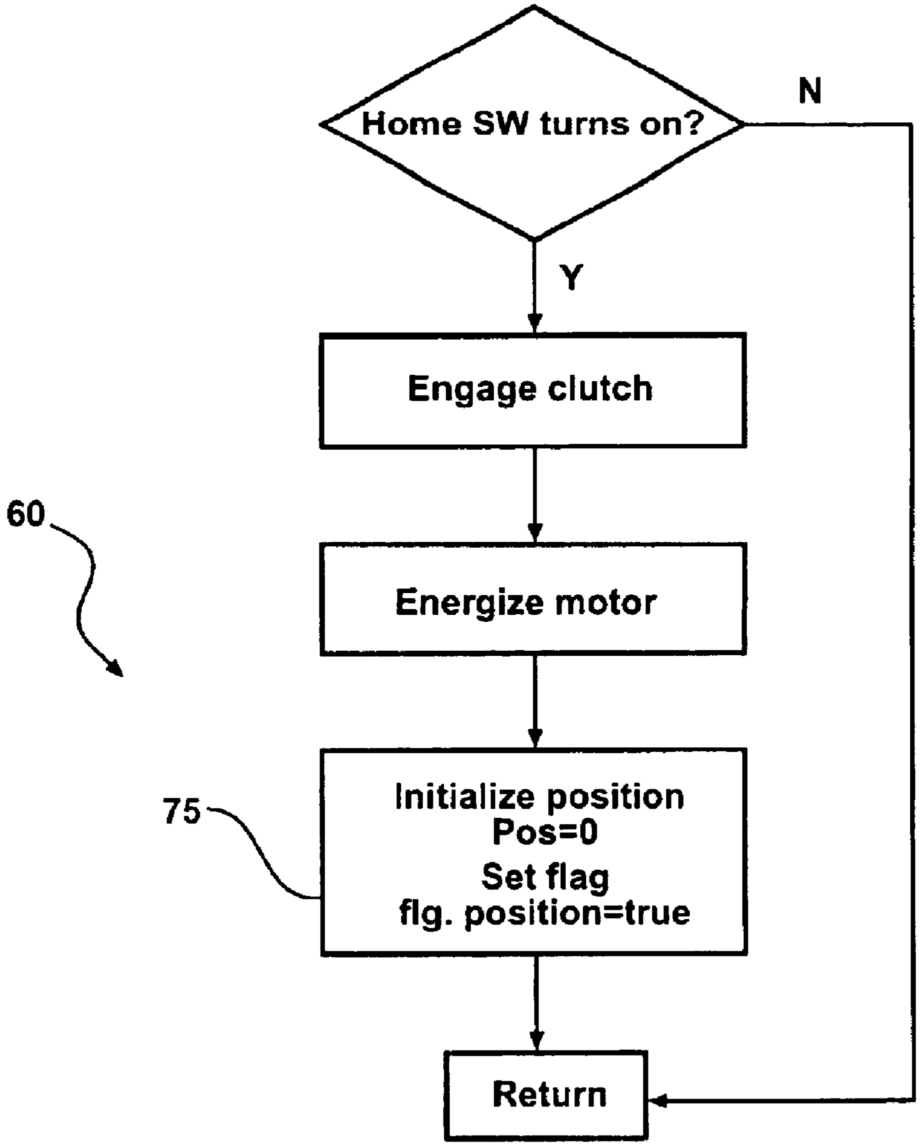
FIG. 3 is a flow chart diagram illustrating an example method of controlling the embodiment of FIG. 2.

FIG. 3 schematically illustrates, in flow chart diagram form, a method according to the inventive approach for obtaining an initialization position. In the illustrated example, the controller begins by determining that the home position switch 56 provides an indication that the door 22 is closed. Once the closed door position has been confirmed, the controller then determines whether the clutch 48 is engaged. In the event that the clutch is already engaged, the procedure may continue. In the event that the clutch 48 is not engaged, the controller engages the clutch prior to energizing the motor 42. The controller preferably energizes the motor 42 sufficiently to develop a selected torque to eliminate any slack between the motor 42 and the door 22 that may be present in the mechanical coupling between them.

In one example, the motor 42 preferably operates at a constant torque and that provides an indication that no slack remains in the coupling between the motor 42 and the door 22. Eliminating slack is important because it impacts the position indication from the sensor 54. By eliminating slack, this invention provides an improved, more accurate and more reliable position initialization technique.

Figure 4A:
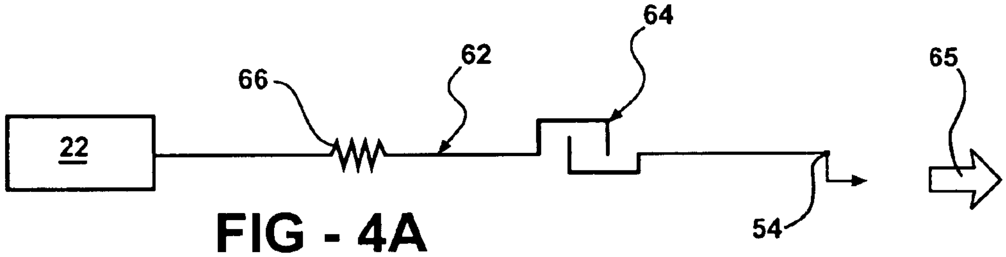
FIG. 4A schematically illustrates selected features of the power closure system during a portion of the inventive position initialization procedure.

FIG. 4A schematically illustrates a mechanical coupling 62 between the door 22 and the motor 42 (not illustrated in FIG. 4A). When the mechanical coupling 62 does not have sufficient tension as shown in FIG. 4A, there is slack as schematically shown at 64. As can be appreciated by comparing FIG. 4A to FIG. 4B, as slack 64 is eliminated, the position of the sensor 54 changes even though the door position remains unchanged. The movement from FIG. 4A to FIG. 4B is accomplished by energizing the motor 42, which urges the sensor 54 toward the closed position as shown by the arrow 65.

Figure 4B:
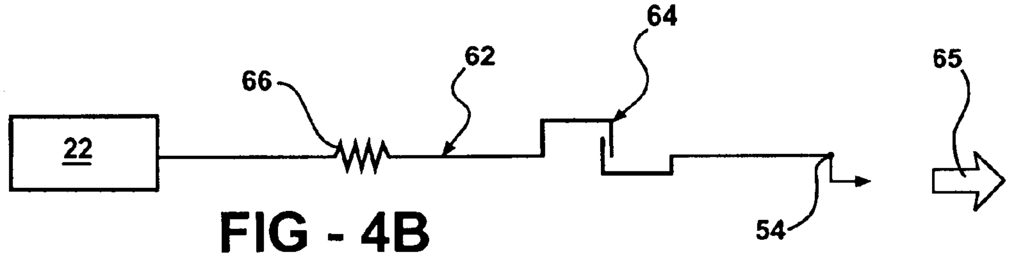
FIG. 4B schematically illustrates the components from FIG. 4A in a different state compared to FIG. 4A.
Figure 4C:
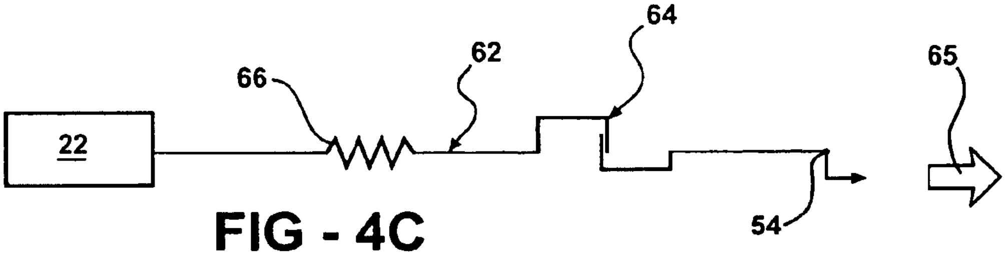
FIG. 4C illustrates the components of FIGS. 4A and 4B in another operating state.

The mechanical coupling 62 may also include a spring factor as known, which is schematically illustrated by the spring 66 in FIGS. 4A through 4C. Upon energizing the motor 42, slack begins to be eliminated in the coupling 62. At some point, the spring factor 66 undergoes increased tension because of the torque of the motor 42. One feature of this invention includes determining the ideal torque to be applied by the motor 42 during the position initialization procedure as will be described below. FIG. 4C schematically illustrates the relative position of the sensor 54 and the door 22 when the door is in the closed position and all slack has been eliminated from the coupling 62.

Figure 5:
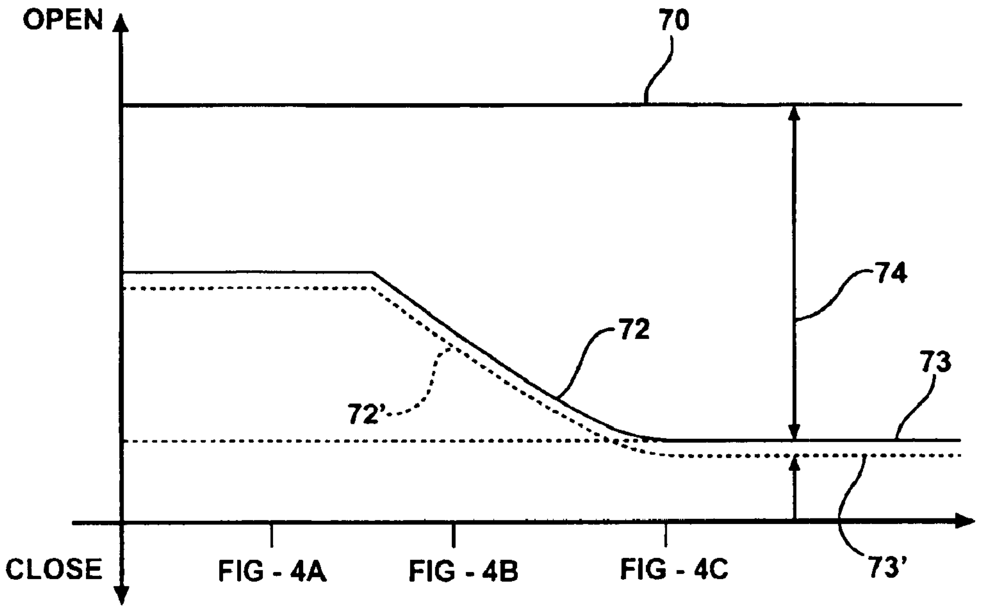
FIG. 5 graphically illustrates an example relationship between vehicle panel position and sensor position information.

FIG. 5 graphically illustrates the changes between the door position and the sensor position during the slack removing procedure. The door position is shown at 70, which remains constant in this example because the door 22 is in a fully closed position as indicated by the home position switch 56 at the beginning of the position initialization procedure. The sensor position output is shown at 72, which changes relative to the door position as slack is removed from the coupling 62. The sensor position eventually gets to a point indicated at 73, where the slack is removed and the relationship between the actual door position and the sensor output is constant and reliable.

This example implementation of the inventive approach includes using the sensor position corresponding to the output value at 73 as the initialization position. Once the slack has been removed from the coupling between the door and the motor and the appropriate spring factor has been compensated for by controlling motor torque, for example, the difference 74 between the sensor position 73 and the door position 70 should become constant. Therefore, since the door position is constant at the full close position, the sensor position in this condition can be considered constant so that the system can set this sensor position at a predetermined value. This step is schematically shown in the box 75 of the flow chart 60 in FIG. 3, for example.

In one example, when the actual sensor position differs from the constant as shown in FIG. 5, the difference is considered as drift or error in sensor position and thus the system shall reset the sensor position at the predetermined constant value. FIG. 5 includes a second sensor position trace 72' varies from the sensor position 72 by an error amount equal to the difference between the sensor value at 73 and the value at 73'.

One example embodiment of this invention compensates for the error between the sensor values 73 and 73' by resetting the sensor position at the predetermined value when the system is in the condition where the sensor value is 73'. For example if the value at 73 is 100 and the value at 73' is 98, then the sensor value is set to be 100 regardless of the actual sensor position.

In another example, the sensor position is adjusted in an amount corresponding to the amount of error. With a sensor value at 73 of 100 and 98 at 73', the error is 2 (100–98=2). The updated sensor position is the old position (98) plus the error adjustment (2), which provides a new sensor value of 100. As can be appreciated in these two examples, the same result is achieved.

Figure 6:
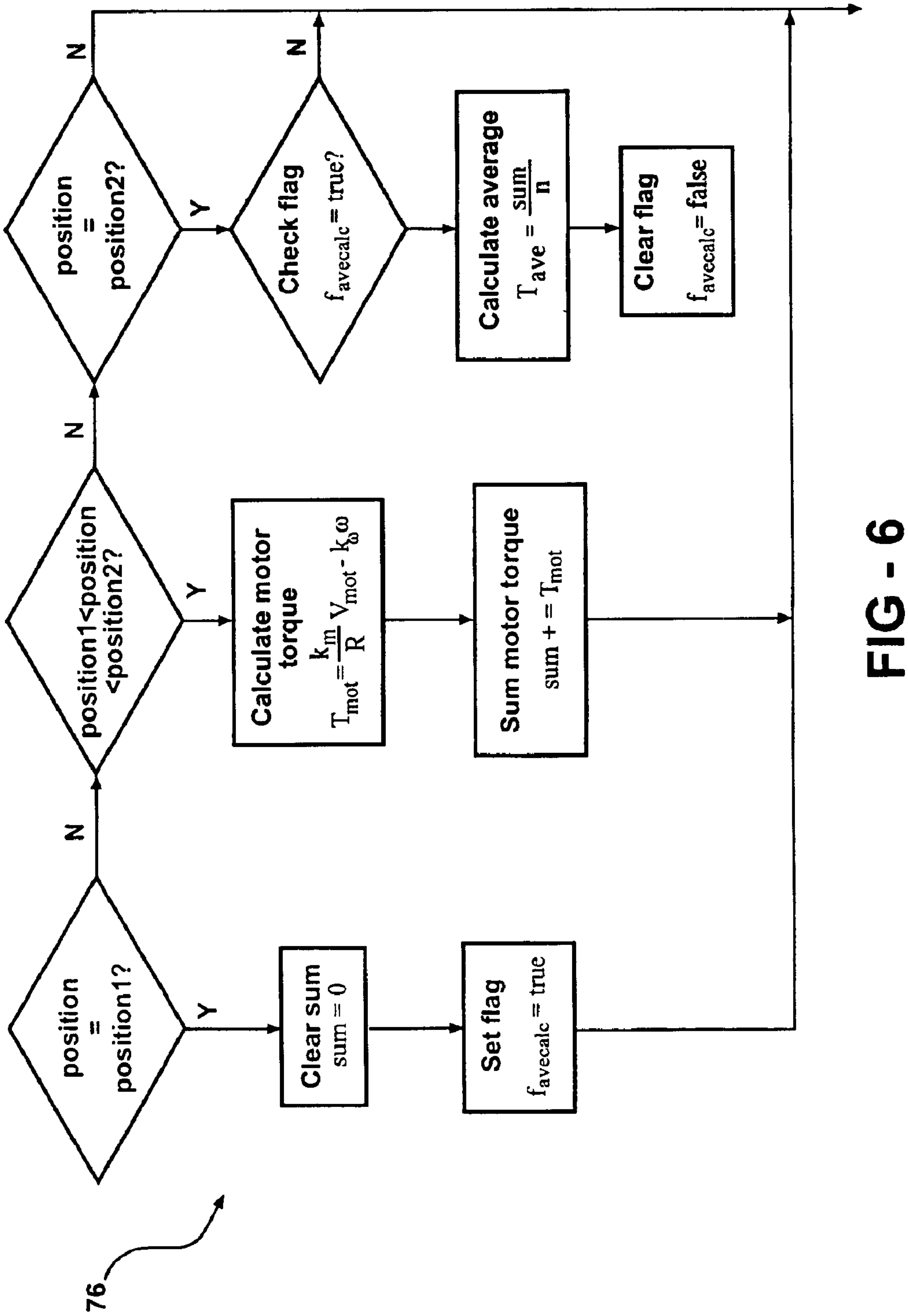
FIG. 6 is a flow chart diagram schematically illustrating a torque calculation approach useful with a system designed according to this invention.

FIG. 6 schematically illustrates, in a flow chart 76, one example technique for determining the appropriate motor torque at which to operate the motor 42 during the position initialization procedure. According to this example, an average motor torque during the most recent automated door closing procedure between selected points along the door travel is used as the selected torque. According to this example, the motor 42 operates at a torque during the position initialization procedure that corresponds to the motor torque when the slack is removed and the spring factor of the coupling 62 is at a level that corresponds to the door being moved. According to this example, the ideal torque applied by the motor 42 during the position initialization procedure is the same torque used for moving the door during the most recent closing operation.

According to one example, whenever the motor stalls or the vehicle panel encounters an obstruction along the travel toward the closed position, the motor torque calculation is ignored for that particular power closing sequence.

Referring to FIG. 6, the controller determines when the door 22 is moved between a selected position 1 and a second selected position 2. Once the door is moved into position 1, a sum value is set to zero. A flag indicating that the average torque calculation should be made is set to be true. Provided that the door is between the position 1 (i.e., a starting position for the average torque calculation) and the position 2 (i.e., an ending position for the motor torque calculation), the motor torque is calculated using the applied voltage and the angular velocity.

There are a variety of motor torque calculation techniques that are known and the illustrated example includes using the motor equation where the motor torque, $T_{mot}=(k_m/R) V_{mot}-k_\omega\omega$; where R=the resistance between the two voltage measuring points including armature resistance, $k_\omega$=the back EMF constant and $k_m$=the motor constant. Provided that the door 22 is moving between the position 1 and position 2, the motor torque sum increases according to the measure value.

Once the door reaches the position 2, the controller determines whether the average calculation flag is still true. Once that is confirmed, the average torque is calculated by dividing the sum motor torque by the number of motor torque measurements applied to the sum as the door moved between the position 1 and position 2.

The average calculation flag may not be true in a situation, for example, where the door 22 is between position 1 and position 2 at the beginning of a power closure operation. In another example, even though the average calculation flag may be set to be true as the door 22 passes the position 1, that flag may be changed to a false value in the event that the motor stalls or that the door 22 encounters an obstruction while moving between the position 1 and position 2.

In one example, it is preferred to select the position 1 and the position 2 as close as possible to the closed position for the corresponding vehicle panel. Utilizing an average motor torque calculation in this manner provides an example way of determining the appropriate torque at which to operate the motor 42 during the position initialization procedure. By utilizing the inventive approach, a more accurate and reliable position initialization is obtained, which allows for better position determinations during a power closure operation.

Figure 7:
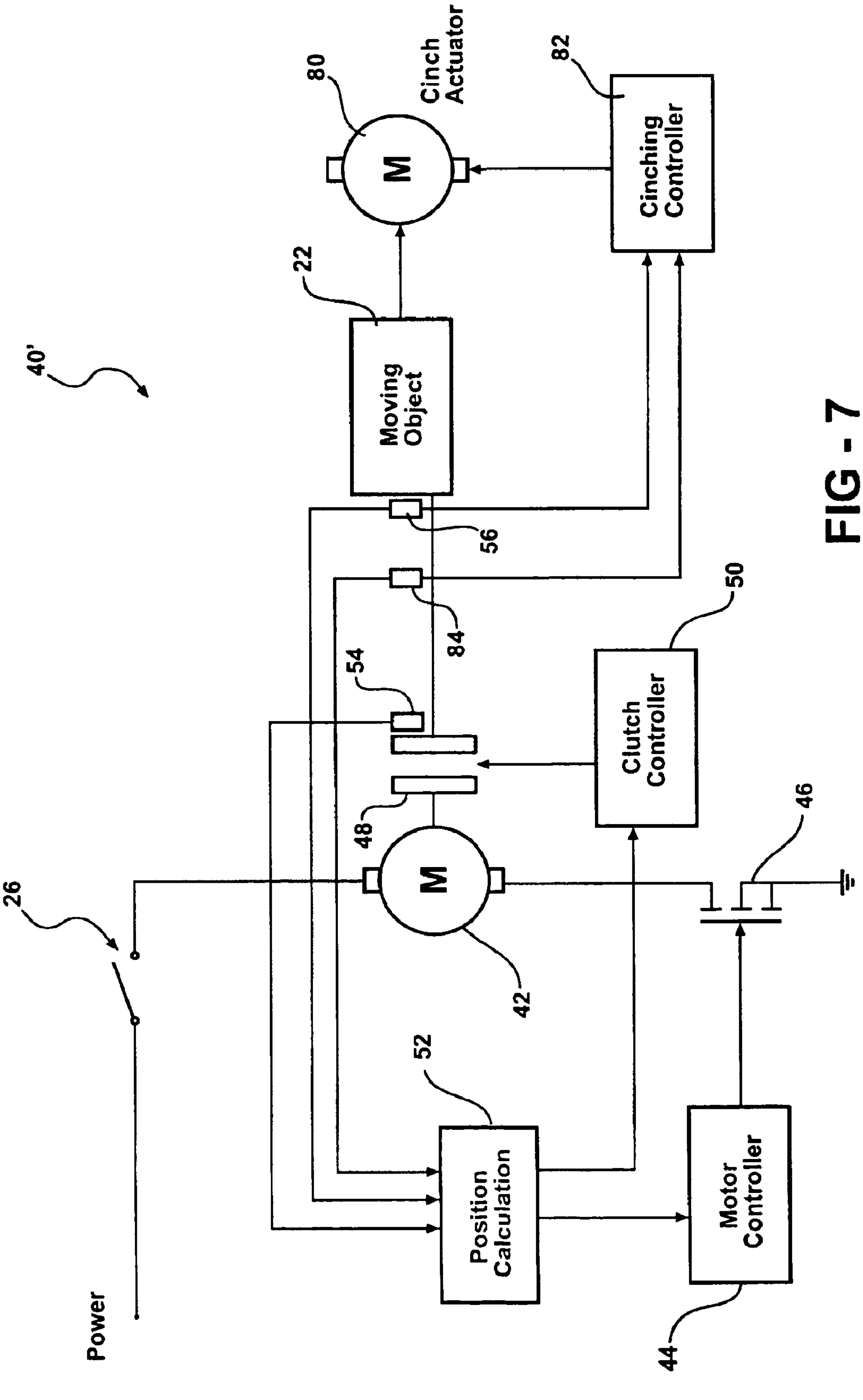
FIG. 7 schematically illustrates another example power closure system designed according to this invention.

FIG. 7 schematically illustrates another example arrangement designed according to this invention. In this example, the system 40' includes a cinch actuator 80 that operates responsive to a cinching controller module 82. This module, like those described above, may be incorporated into a single microprocessor or may be a dedicated controller, depending on the needs of a particular situation. This cinching actuator 80 in one example consists of an electric motor and clutch. In another example, the cinching actuator comprises a conventional strike. Cinching actuators operate in a known manner to pull a vehicle panel into the fully close position when the panel enters a partially close position as known in the art.

The system 40' also differs from the system 40 because a detent switch 84 is provided that indicates that the door 22 has entered the partially close position, or more particularly, the secondary position before the cinch actuator has pulled the panel into the fully closed position, or more particularly, the primary position, which is indicated by the home position switch 56.

Figure 8:
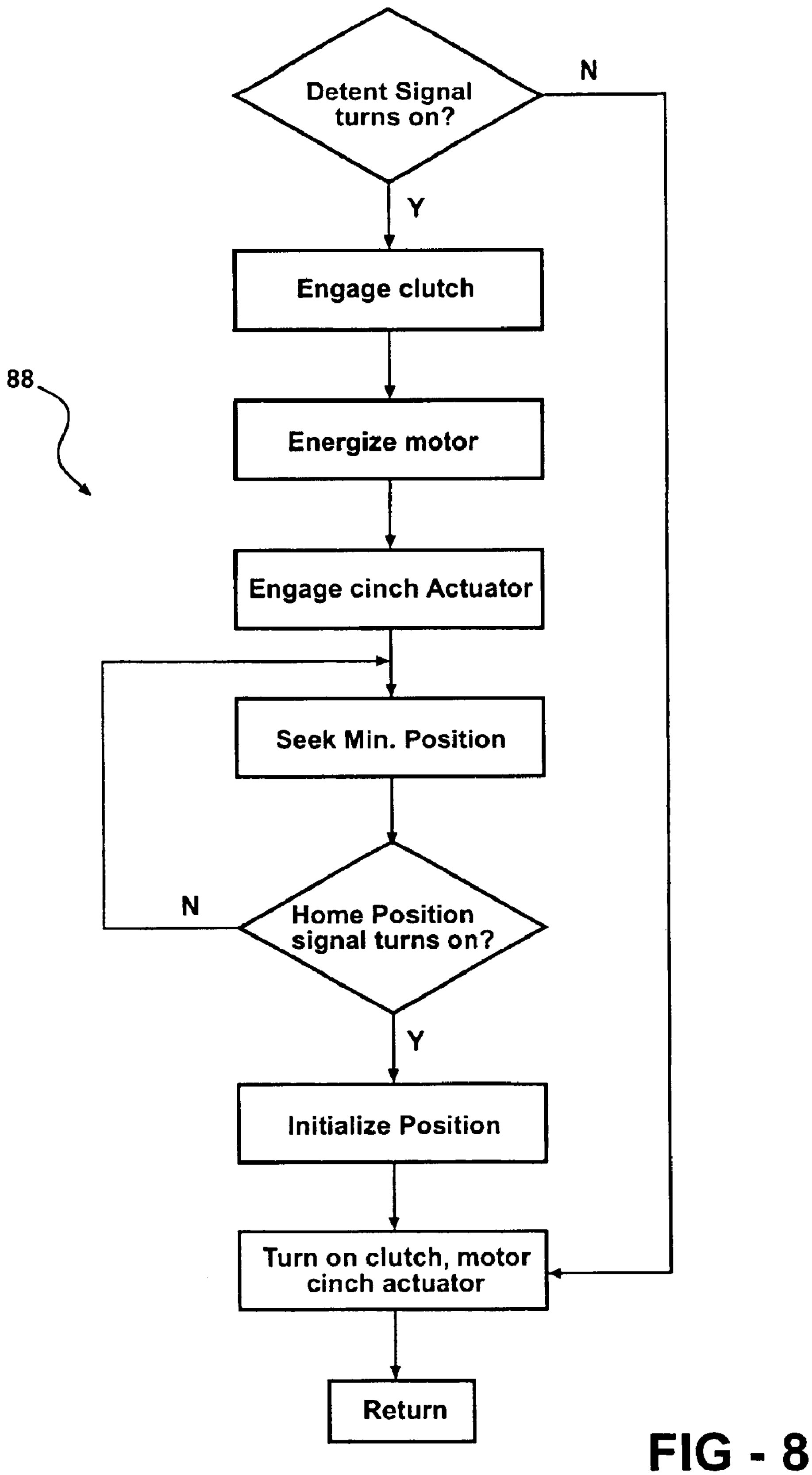
FIG. 8 is a flow chart diagram schematically illustrating a control method useful with the embodiment of FIG. 7.

Power closure arrangements having a cinch actuator introduce further complexity into position initialization. This invention includes techniques for accommodating such arrangements. The flow chart diagram 88 in FIG. 8 schematically shows an example approach for position initialization in the embodiment of FIG. 7. Once the detent switch 84 provides a signal indicating that the door 22 has reached the secondary position, the controller determines that the clutch 48 is engaged and then energizes the motor 42. At the same time, the cinching actuator 80 is energized until the home position switch 56 provides an indication that the door 22 has reached the primary position. While this is occurring, the controller seeks to locate the minimum position reading from the sensor 54. Once the home position switch 56 provides an indication that the door 22 is fully closed, the controller is able to utilize the initialization position information from the sensor 54.

Figure 9:
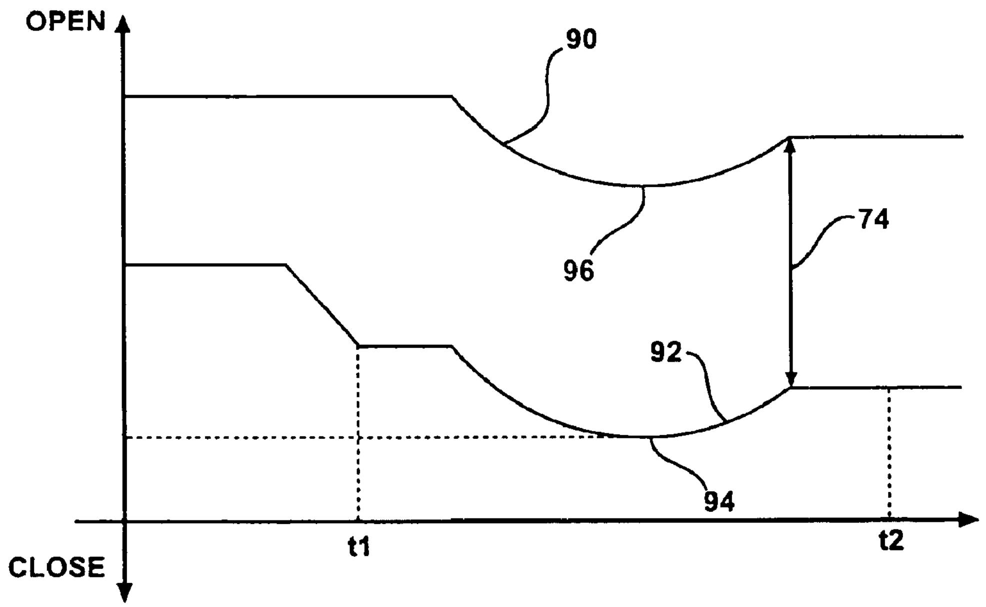
FIG. 9 graphically illustrates a relationship between vehicle panel position and sensor position information.

In one example, it is preferred to initialize the position information at the tightest closing position of the appropriate vehicle panel. FIG. 9 schematically illustrates the behavior of an example panel position at 90 compared to the behavior of an example sensor output at 92. As the motor 42 takes up slack and gets sufficient tension, the difference between the sensor position and the door position eventually becomes constant beginning at time t1 in FIG. 9. At the same time that the sensor position 92 reaches a minimum at 94, the door position 90 reaches a minimum value 96. The minimum door position 96 is mechanically determined and, therefore the minimum position 94 can be considered constant. The minimum sensor position at 94 preferably is used as the initialization position since the difference 74 at that point is constant.

In one example, the controller determines the minimum position 94 by monitoring the sensor output throughout the position initialization process and the cinching provided by the cinch actuator 80. In one example, the controller determines the minimum position sensor output and uses that as the initialization position to initialize or adjust the sensor position.

A difficulty associated with arrangements having cinching mechanisms is that the sensor position is still changing when it reaches the minimum at 94. The difference can be considered as drift or error in the sensor position in the same manner as explained in the first example in FIG. 5. In one example, the second error compensation approach described in connection with FIG. 5 preferably is applied. For example, if the predetermined value for the sensor minimum position is 100, the actual sensor minimum position is 98 and the sensor position at t2 when cinching is complete is 128. The error is 100=98=2. The new sensor position=128+2=130 (old sensor position+adjustment).

The same motor torque determination and torque control techniques as described in connection with the embodiment of FIGS. 1-6 preferably are used when reducing slack and initializing the sensor position with the embodiment of FIGS. 7-9.

The inventive arrangement provides an improved position control system because it provides improved accuracy in obtaining an initialization position for monitoring vehicle panel position during an automated movement of that panel.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A method of determining an initialization position of a moveable panel on a vehicle that is moved by a motor, comprising the steps of:

(A) determining that the panel is in a closed position;

(B) energizing the motor to urge the panel toward the closed position to reduce any slack associated with a coupling between the motor and the panel; and (C) determining the initialization position when there is no slack.

2. The method of claim 1, including performing step (B) when the motor is operating at a selected torque.

3. The method of claim 2, wherein the selected torque is an average torque determined when the motor is moving the panel between first and second positions spaced along the travel of the panel from an open position to the closed position.

4. The method of claim 3, including selecting the first and second positions near the closed position of the panel.

5. The method of claim 1, including providing a sensor that provides an output indicative of the panel position and wherein step (C) includes obtaining an output from the sensor when there is no slack.

6. The method of claim 1, including determining that there is no slack by determining that the motor operates at a constant torque during step (B).

7. A system for moving a moveable panel, comprising:

a motor;

a coupling that couples the motor to the panel and includes a varying tension between the motor and the panel;

a position sensor that provides an indication of the panel position;

an indicator that provides an indication when the panel is in a closed position; and a controller that energizes the motor responsive the closed position indication to urge the panel toward the closed position to reduce any slack between the motor and the panel, the controller obtaining an initialization position indication from the position sensor when there is no slack.

8. The system of claim 7, wherein the controller obtains the initialization position indication only when the motor is operating at a selected torque level that corresponds to an average torque determined when the motor is moving the panel between first and second positions spaced along the travel of the panel from an open position to the closed position.

9. A method of initializing a motor that automatically moves a moveable panel on a vehicle between open and closed positions, comprising the steps of:

removing any slack associated with a coupling between the motor and the panel after the panel is in a closed position; and determining an initialization position when there is no slack.

10. The method of claim 9 including energizing the motor and using a selected torque to remove any slack associated with the coupling.

11. The method of claim 10, including selecting the torque as an average motor torque between selected first and second positions along the movement of the panel from an open position toward the closed position.

12. The method of claim 11, including determining whether the panel was obstructed or the motor stalled during the movement between the first and second positions and only determining the average torque if the panel was not obstructed and the motor did not stall.

13. The method of claim 9, including determining that a clutch associated with the motor is engaged prior to energizing the motor.

14. A system for moving a moveable panel on a vehicle, comprising:

a motor;

a coupling between the motor and the panel; and a controller that controls the motor to reduce any slack between the motor and the panel after the panel is in a closed position, the controller determining an initialization position when there is no slack between the motor and the panel.

15. The system of claim 14, wherein the controller causes the motor to operate at a torque that is an average torque associated with the motor as the panel moves between selected first and second positions along the movement of the panel from an open position toward the closed position.

16. The system of claim 15, wherein the controller determines whether the panel was obstructed or the motor stalled during the movement between the first and second positions and only determines the average torque if the panel was not obstructed and the motor did not stall.

17. The system of claim 14, including a clutch associated with the motor and wherein the controller determines that the clutch is engaged prior to energizing the motor.

* * * * *